(12) United States Patent
Davis

(10) Patent No.: US 11,740,118 B2
(45) Date of Patent: *Aug. 29, 2023

(54) LINE VOLUME CALIBRATION SYSTEMS AND METHODS

(71) Applicant: LIFE TECHNOLOGIES CORPORATION, Carlsbad, CA (US)

(72) Inventor: Glen Davis, Junction City, OR (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,264

(22) Filed: Dec. 21, 2022

(65) Prior Publication Data

US 2023/0119629 A1 Apr. 20, 2023

Related U.S. Application Data

(63) Continuation of application No. 16/892,502, filed on Jun. 4, 2020, now Pat. No. 11,573,118.

(60) Provisional application No. 62/858,507, filed on Jun. 7, 2019.

(51) Int. Cl.
*G01N 29/22* (2006.01)
*G01F 25/17* (2022.01)
*G01F 15/00* (2006.01)

(52) U.S. Cl.
CPC ............ *G01F 25/17* (2022.01); *G01F 15/005* (2013.01); *G01N 29/222* (2013.01); *G01N 2291/02836* (2013.01)

(58) Field of Classification Search
CPC .... G01F 25/17; G01F 25/0084; G01F 15/005; G01F 17/00; G01F 22/00; G01N 29/222; G01N 2291/02836; G01N 35/1016
See application file for complete search history.

(56) References Cited

U.S. PATENT DOCUMENTS

| | | | |
|---|---|---|---|
| 5,777,221 A | 7/1998 | Murthy et al. | |
| 9,283,560 B2 | 3/2016 | Dothie | |
| 10,302,533 B2 | 5/2019 | Maillart et al. | |
| 11,353,385 B2* | 6/2022 | Hakimuddin | G01N 3/12 |
| 2013/0273641 A1 | 10/2013 | Ball et al. | |
| 2017/0131245 A1* | 5/2017 | Stoll | G01N 30/32 |
| 2020/0030794 A1 | 1/2020 | Perkins et al. | |

FOREIGN PATENT DOCUMENTS

| | | |
|---|---|---|
| JP | 2014-106105 A | 6/2014 |
| WO | 2017/011554 A1 | 1/2017 |

* cited by examiner

*Primary Examiner* — Suman K Nath
(74) *Attorney, Agent, or Firm* — BakerHostetler

(57) ABSTRACT

Provided are systems and methods for line volume calibration, and measurement of fluid samples delivered to an interrogation point. In various embodiments, a known fluid volume comprising a sample line fluid and a secondary fluid is delivered to a fluid boundary sensor. The fluid boundary sensor assists in determining the position of the boundaries between the various fluids, and the positions of these boundaries are used to determine the sample line fluid volume.

4 Claims, 11 Drawing Sheets

LINE VOLUME CALIBRATION SYSTEMS AND METHODS

RELATED APPLICATIONS

The present application is a continuation of now-allowed U.S. patent application Ser. No. 16/892,502, "Line Volume Calibration Systems And Methods" (filed Jun. 4, 2020); which application claims priority to and the benefit of U.S. patent application No. 62/858,507, "Line Volume Calibration Systems And Methods" (filed Jun. 7, 2019). The foregoing applications are incorporated herein by reference in their entireties for any and all purposes.

TECHNICAL FIELD

The present disclosure generally relates to line volume measurements for fluidic samples.

BACKGROUND

When analyzing very small sample volumes, e.g., on the microliter scale, fluidic analysis instruments must be very precise when measuring the sample volume and collecting data. Flow cytometry, for example, can analyze single cells suspended in fluid, as the fluid passes by a highly focused laser beam, and obtains information about the cells based on the scattered light. In such experiments, the precise volume (i.e., line volume) of the fluid sample must be known to accurately correlate the timing of the scattered light (e.g., forward scattered light, side scattered light) from cells and also fluorescence from fluorescent labels associated with cells of the fluid sample. Likewise, the precise timing of when the sample enters and exits the interrogation region is essential for determining start/stop times for data collection and analysis. Thus, having an accurate determination of the fluid line volume between the sample origination point and the interrogation point is critical to system performance.

Current methods to address these challenges include beginning an analysis of the sample fluid late and ending the analysis earlier than the actual beginning and end of the sample. Cutting off analysis of the leading and trailing ends as the sample fluid passes the interrogation point ensures that it is sample fluid that is being analyzed, not air or other non-sample fluid in the line.

A shortcoming of this approach, however, is that a portion the sample fluid is wasted and is not analyzed. This can be particularly problematic during experiments attempting to detect and analyze rare events (e.g., cells in a sample fluid expressing a rare protein), as rare event analytes that are present in only dilute quantities can be missed if some of the sample fluid that contains such analytes is discarded or not analyzed. Further, some events of interest may not end up being analyzed because of their location at the beginning or end of the fluid sample.

Careful sample line manufacturing methods are intended to provide consistent and reliable sample line volumes, as such careful manufacturing methods attempt to ensure that sample line volumes fall within a certain tolerance or range. This approach, however, often results in a higher cost of manufacturing and testing of sample lines. In addition, during analysis, sample arrival times must be calculated with larger margins of error to allow for variations in the line volume. This in turn results in waste of potentially valuable sample, and portions of both ends of the analysis period must be discarded (and with such discard, the potential loss of valuable information that could be critical for both research purposes as well as clinical purposes associated with diagnosing a patient).

Accordingly, there is a long-felt need in the art for improved methods and systems of line volume calibrations and sample measurements.

SUMMARY

In meeting the described challenges, the present disclosure first provides systems and methods for measuring, estimating, and/or determining a volume of sample. A method can comprise: disposing a calibration volume of a first fluid into the sample line such that the calibration volume completely fills the sample line, the completely filled sample line defining a volume SL therein; communicating into a sample zone the calibration volume of the first fluid and also a displacement volume of a second fluid, the calibration volume of the first fluid and the displacement volume of the second fluid defining a total volume; communicating the total volume from the sample zone to a sensor configured to identify a boundary between the first fluid and the second fluid; and from the boundary, estimating the volume SL of the sample line.

The present disclosure also provides systems and methods, comprising: a sample line enclosing a volume SL therein; a sample zone configured to receive a first fluid from the sample line; a fluid delivery train configured to (a) deliver a volume of the first fluid into the sample line, (b) deliver a calibration volume CV of the first fluid that completely fills the sample line from the sample line into the sample zone, and (c) deliver a displacement volume D of a second fluid into the sample zone such that the calibration volume CV of the first fluid and the displacement volume D of the second fluid define a total volume TV; a sensor region configured to receive the first fluid and the second fluid from the sample zone and to detect a boundary between the first fluid and the second fluid; a flow diverter train configured to (a) place the sample line into fluid communication with the sample zone, (b) place the sample zone into fluid communication with the sensor, or both (a) and (b); and optionally, a processor configured to determine a volume enclosed by the first sample line based on at least a difference between the volume D of the displacement volume of the second fluid and the total volume TV.

Additionally provided are systems and methods for estimating a volume of a sample fluid, comprising: delivering an amount of a first fluid to a conduit; delivering an amount of a second fluid into the conduit so as to displace the first fluid within the conduit; estimating a total volume of the first fluid and the second fluid in the conduit; delivering the first fluid and the second fluid from the conduit to a sensor capable of determining a boundary between the first fluid and the second fluid; determining a volume of the second fluid in the total volume; and estimating a volume of the sample fluid based on at least the volume of the first fluid and the estimated total volume of the sample fluid and the first fluid.

Also provided are systems for automatically determining the volume of a sample, the system comprising: a sensor region; a fluid delivery train configured to separately deliver a volume of a second fluid and a volume of a first fluid into the sensor region, the sensor region being configured to measure a signal through the sensor region, the signal differing based on the presence of the first fluid in the sensor region or the presence of the second fluid in the sensor region; and a processor configured to determine a volume of the sample based on the signal measured when the first fluid and the second fluid are communicated through the sensor region.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary embodiments of the disclosed subject matter; however, the disclosed subject matter is not limited to the specific methods, compositions, and devices disclosed. In addition, the drawings are not necessarily drawn to scale. In the drawings.

DETAILED DESCRIPTION OF ILLUSTRATIVE EMBODIMENTS

Figure 1A:
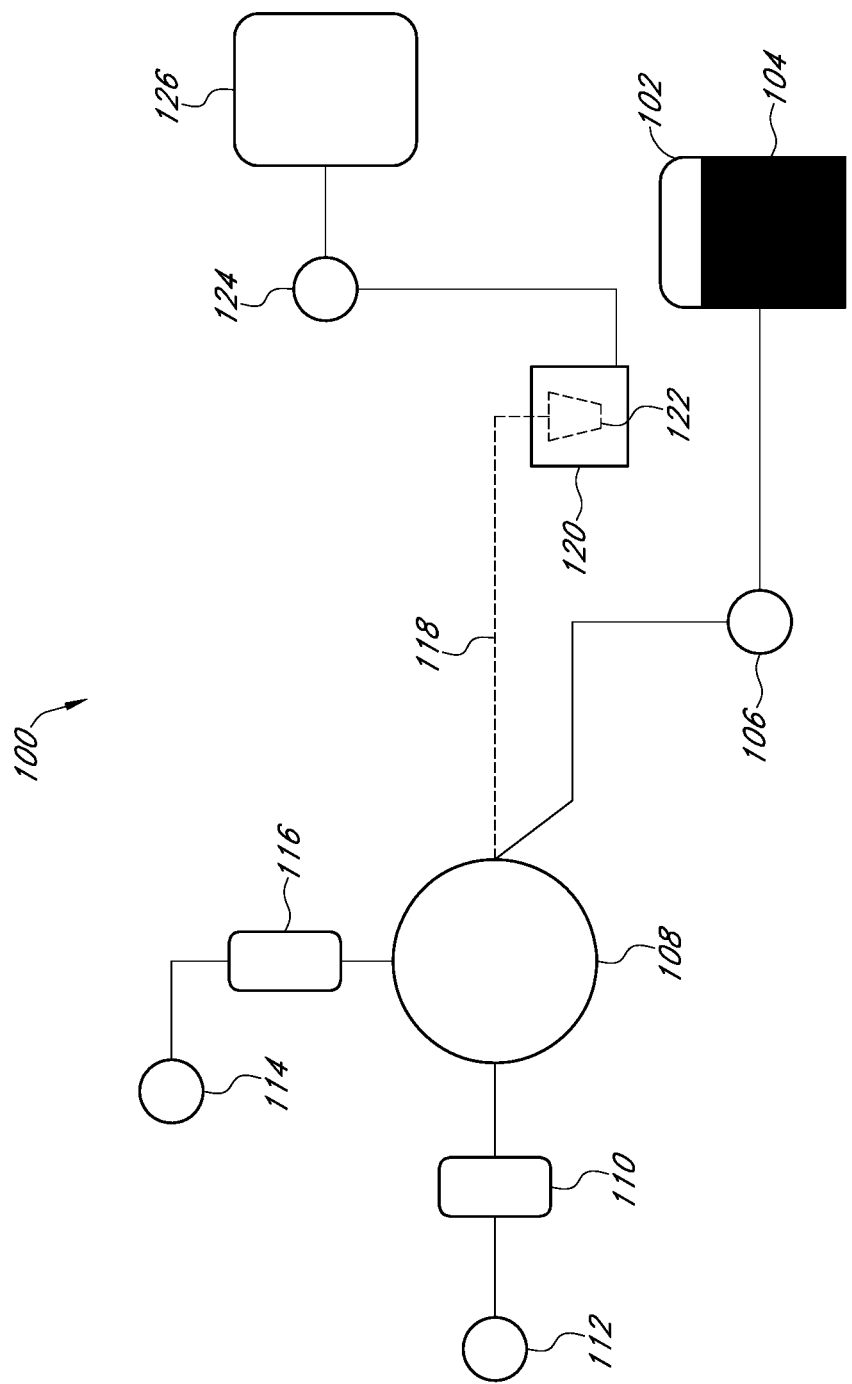
FIGS. 1A-1I provide a depiction of an exemplary system and method according to the present disclosure.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately or in any subcombination. Further, any reference to values stated in ranges includes each and every value within that range. Any documents cited herein are incorporated herein by reference in their entireties for any and all purposes.

In one aspect, the present disclosure provides systems and methods for measuring, estimating, and determining volumes of samples. Various embodiments relate to instruments using a fluidic system to deliver a sample for analysis to an interrogation point. In such systems, an accurate determination of the fluid line volume between the sample origination point and the interrogation point is critical to system performance. Without accurate measurements, the arrival time of the sample at the interrogation point is indeterminate, and can result in potential data loss or corruption, as discussed herein.

Accordingly, the present invention provides many unique advantages over traditional systems and methods. With respect to manufacturing, for example, variations in manufacturing are compensated for by determining the line volume after the system is complete. By having a more precise measurement of the line volume, a greater percentage of the sample can be used for analysis. This is particularly important in cases where there is a small amount of sample for use. In addition, if components of the system are changed at a customer site, the line volume can be easily determined again to allow for any variation that may occur.

In various embodiments, the line volume determinations and sample measurement systems and methods can be installed in implemented in one or more existing systems. That is, the disclosed embodiments are not limited to the depicted illustrations and expels, and can be applied to current analysis systems, e.g., flow cytometers, and improve analyses and data collection.

FIGS. 1A-1I illustrate an example system and method for determining a volume enclosed within a sample line. In embodiments, as discussed herein, the sample line can contain a sample fluid for analysis in one or more instruments.

Figure Elements Legend

For convenience, the following is a list of elements used in connection with FIGS. 1A-1I:

102: Fluid (e.g., focus fluid) tank
104: First fluid (e.g., focus fluid)
106: Pump (configured to communicate fluid 104 from fluid tank 102)
108: Flow diverter (e.g., valve)
110: Fluid boundary sensor (configured to detect a signal related to a boundary between fluids, e.g., a boundary between focus fluid and air)
112: Pump (configured to draw fluid into fluid boundary sensor 110)
114: Pump (configured to draw fluid into sample zone 116, can also be configured to exert fluid out of sample zone 116)
116: Sample zone—a sample zone can be, e.g., within a flow cytometer analyzer (with acoustic and/or hydrodynamic based focusing of cells and other particles), imager, flow cytometer cell and other particle sorter/separator, and the like.
116a: Volume of fluid that fills entirety of sample line 118 out to end of sample line head 122
116b: Second fluid (e.g., air bubble) communicated into sample zone 116 following communication of sample line volume 116a into sample zone 116
118: Sample line (shown with dashed line for ease of reference)
120: Overflow vessel (configured to receive fluid exiting sample line head 122 of sample line 118)
122: Sample line head (shown with dashed line for ease of reference)
124: Pump (e.g., configured to draw fluid from overflow vessel and communicate the fluid to tank 126)
126: Tank FIG. 1A shows an initial state of a system that includes a sample line having a sample line volume to be determined. A first fluid (e.g., focus fluid) 104 can be contained in fluid tank (e.g., a focus fluid tank) 102. As shown, portions of focus fluid can be drawn from fluid tank 102 towards sample line 118. In various embodiments, the sample line and the other conduits through which fluid flows can be tubing comprising one or more of a variety of materials.

Figure 1B:
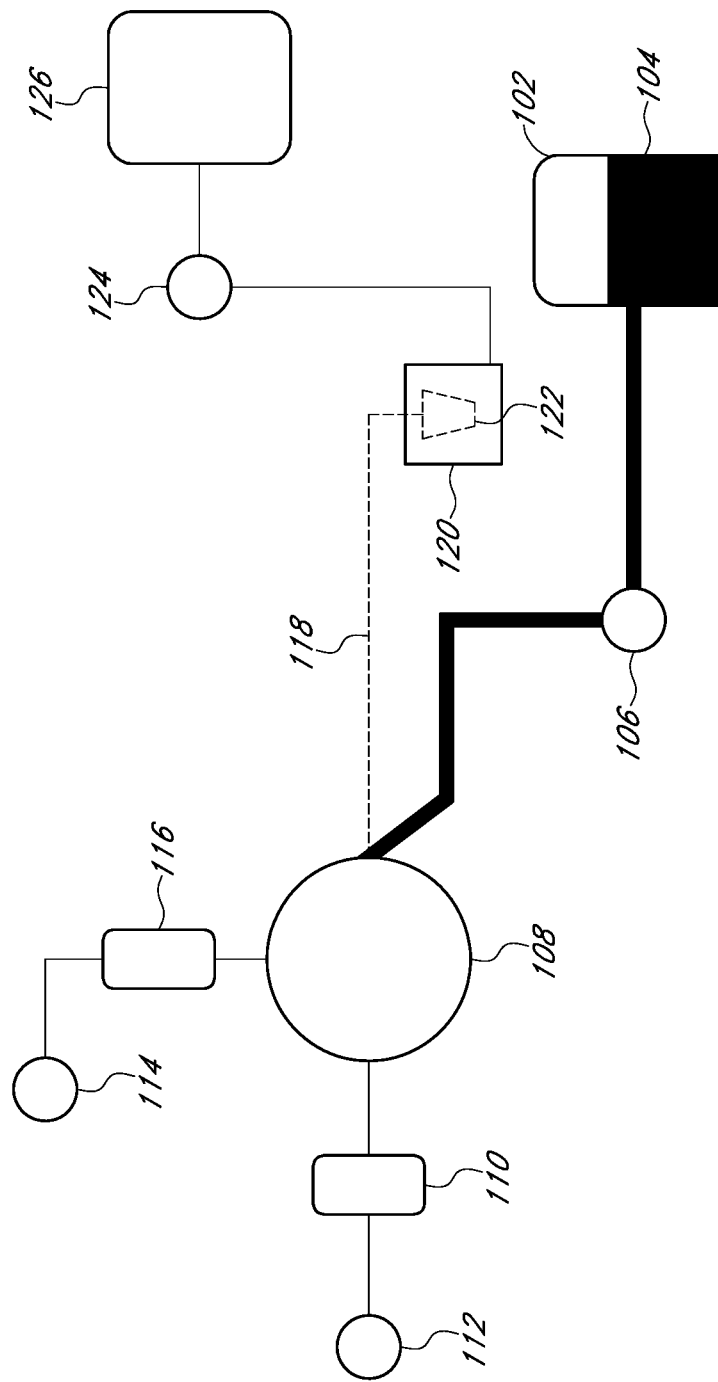

As illustrated in FIG. 1B, pump 106 draws first fluid 104 out of fluid tank 102 and towards a flow diverter 108 (which can be, e.g., a valve or rotary valve), and sample line 118. (For ease of reference, the presence of first fluid 104 is represented by a heavy dark line.)

Flow diverter 108 can be in a state whereby fluid is communicated through one or more fluid lines (not labeled) from tank 102 to sample line 118; as one example, flow diverter 108 can be in a state where sample line 118 is in fluid communication with tank 102 but sample line 118 is not in fluid communication with sample zone 116. It should be understood that flow diverter 108 can be a single unit (e.g., a single valve capable of multiple states). In some embodiments, flow diverter 108 can comprise multiple units (e.g., multiple valves).

Sample line 118 contains the total volume of fluid to be determined. In some embodiments, the focus fluid volume acts as a calibration volume. Sample line 118 can further include a sample line head 122 that in some embodiments is contained in (or empties into) overflow vessel 120 configured to receive excess fluid existing the end of the sample line 118. It will be appreciated that total volume of the sample line 118 includes the volume contained within the filled sample line head 122, which sample head is also the end of the sample line 118.

Figure 1C:
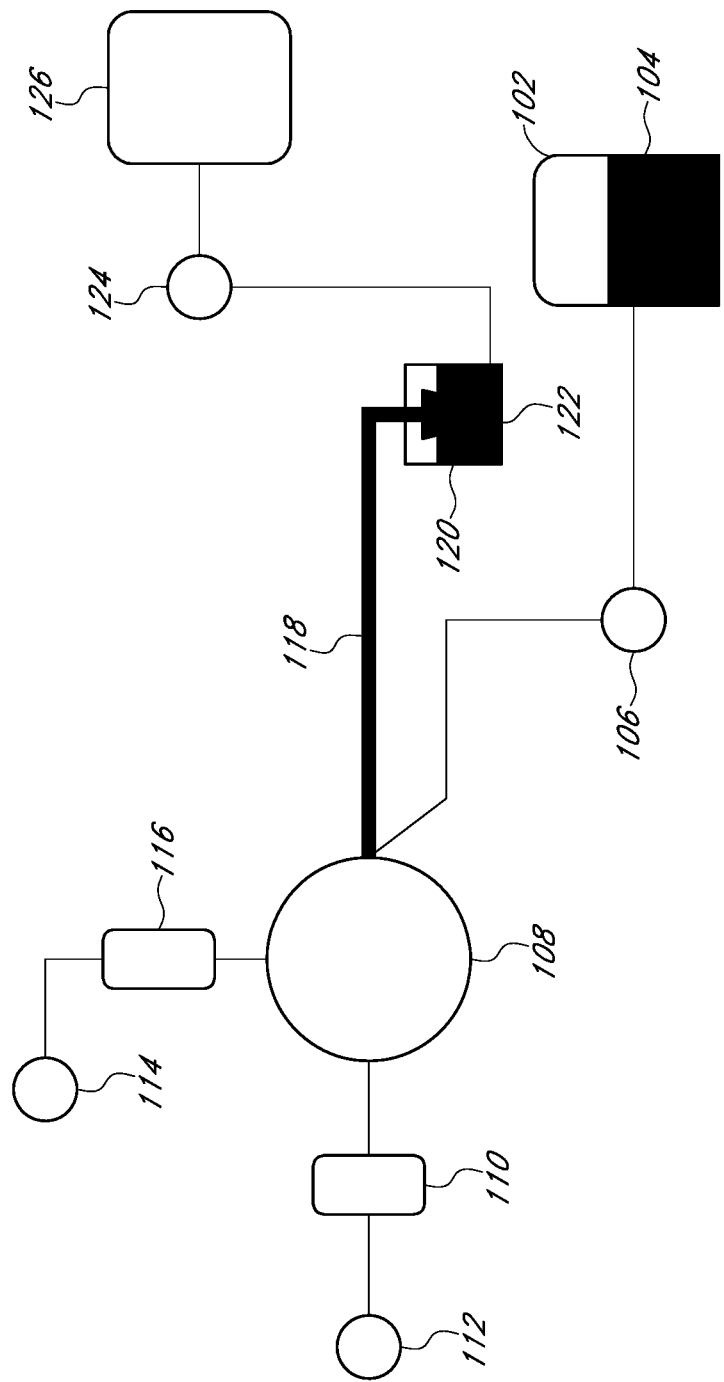

When drawing focus fluid into the sample line 118, as seen in FIG. 1C, excess focus fluid is drawn and deposited into overflow vessel 120. In embodiments, this can occur because the total volume of the sample line is initially unknown, so excess fluid is pumped through to ensure that the sample line 118 is completely filled. In some embodiments, the operational precision of pump 106 can vary, thus drawing excess focus fluid 104 into the sample line. It is considered especially suitable to operate such that sufficient fluid is communicated to sample line 118 such that sample line 118, including the sample head 122, is fully filled. Excess fluid will exit sample line head 122 into overflow vessel 120, which can be in fluid communication with the end of the sample line. In some embodiments, a fluid delivery train can be utilized to remove fluid from the overflow vessel 120 while fluid is retained within the sample line 118 and sample line head 122.

In some embodiments, the amount of excess fluid in the sample line head 122 and overflow vessel 120 is minimized. One or more sensors in the sample line head 122 and overflow vessel 120 can provide feedback to one or more components of the depicted system, including but not limited to the pump 106, to indicate when the sample line head is filled and/or when excess fluid has been realized in the overflow vessel 120, such that the amount of wasted focus fluid is minimized. In this way, a system can operate in an automated fashion such that, e.g., when excess fluid exits sample line head 122 and is detected, the system ceases supplying further fluid to sample line 118 and clears excess fluid that has exited sample line head 122 and has accumulated in vessel 120.

Figure 1D:
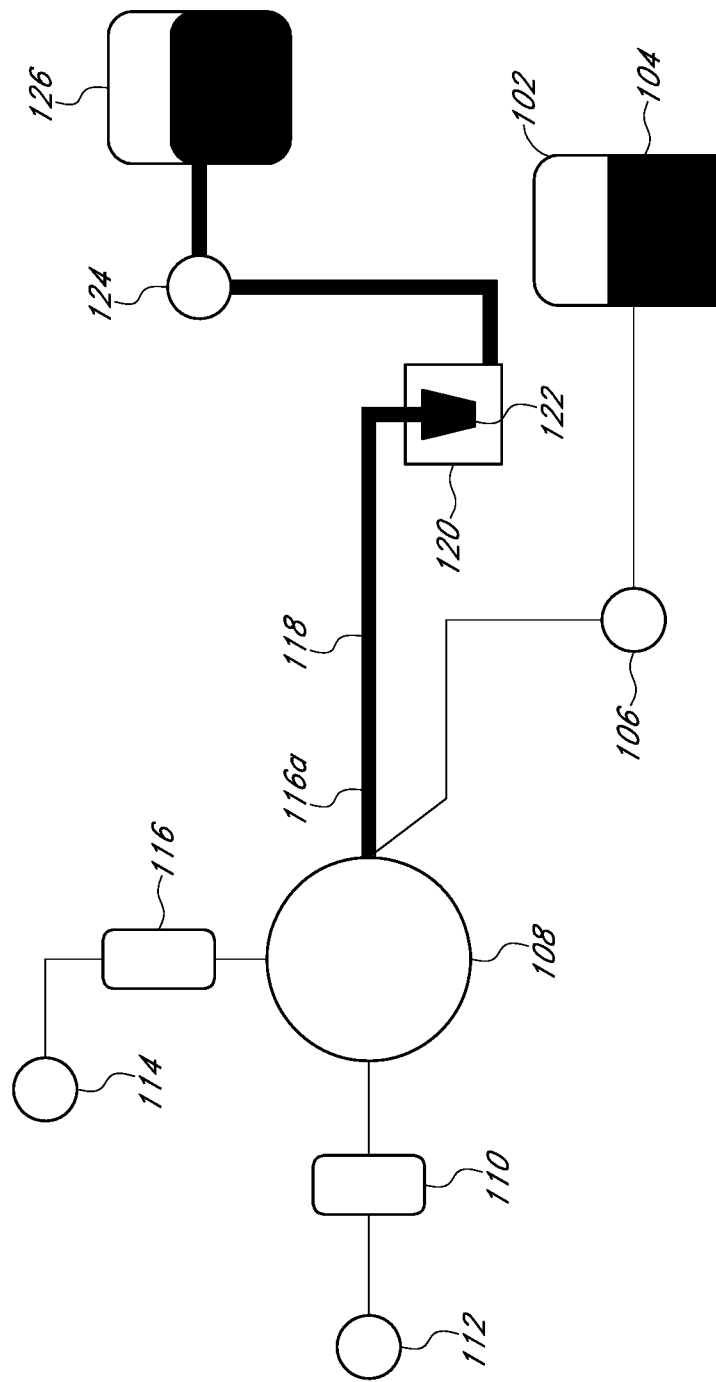

As shown, FIG. 1D illustrates that any excess fluid in the overhead vessel can be communicated to waste tank 126 by fluid delivery train 124 (e.g., a pump). Train 124 is thus configured to draw fluid from the overflow vessel 120 and communicate the fluid to a waste tank 126 or other waste area. It will be appreciated that the train 124 can be configured so as not to remove any focus fluid from sample line 118. Thus, sample line 118 remains completely filled with fluid 104 all the way through the end of the sample line at sample line head 122; the volume of fluid filling sample line 118 to the end of the line is shown by 116a.

After the sample line 118 has been completely filled, pump 114 can operate to communicate the focus fluid contained in the sample line into a sample zone 116, which can be a sample loop. (It should be understood that although 114 is referred to as a pump for convenience, 114 can include one or more pumps, valves, and the like.)

Figure 1E:
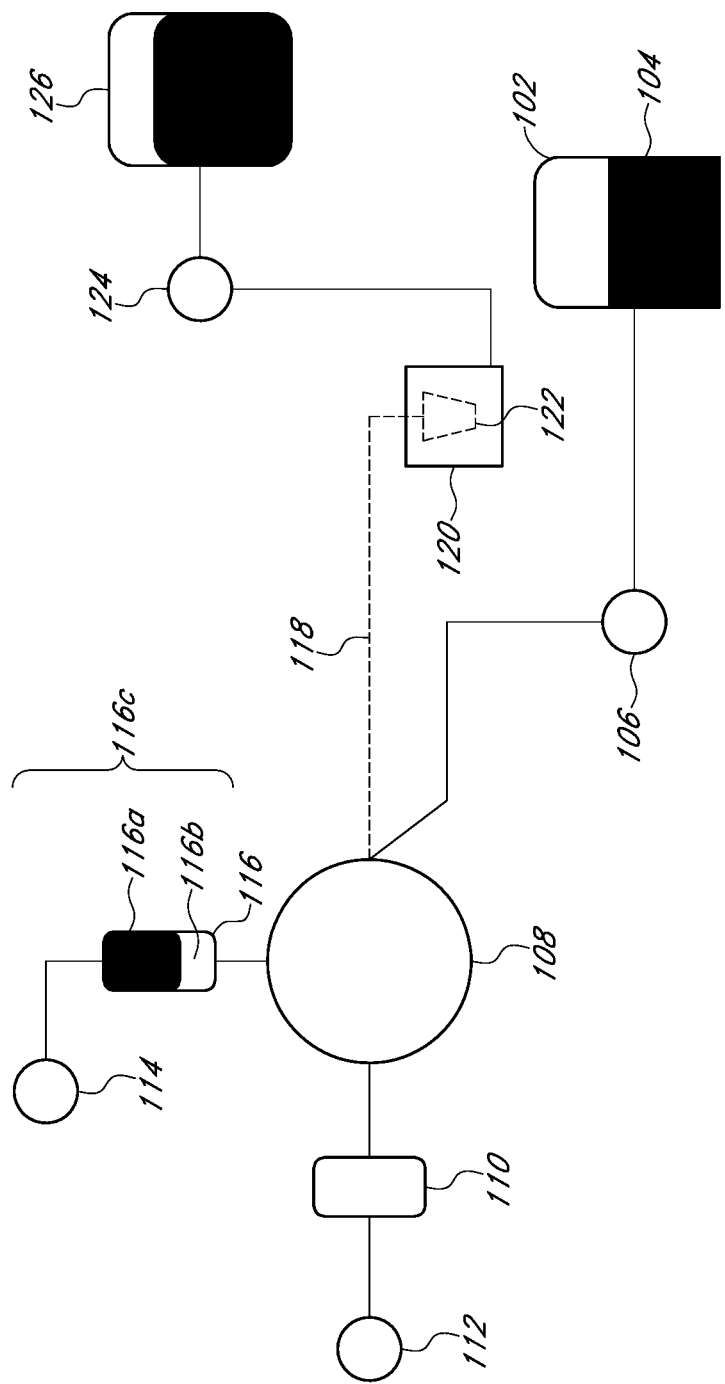

FIG. 1E illustrates sample line volume fluid 116a after fluid 116a has been communicated to sample zone 116. In addition to the fluid 116a from the sample line, pump 114 can also draw a second fluid, e.g., an air bubble, "behind" sample line fluid volume 116a. The second fluid, is shown by bubble 116b within sample zone 116. Thus, the total volume drawn by pump 114 into the sample zone 116 is the sample line fluid volume 116a plus the volume of fluid bubble 116b.

In some embodiments, pump 114 can be a pump (e.g., a syringe pump or other precise modality) that is configurable to draw up a predetermined and/or user-designated amount of fluid, e.g., 450 µl. In other words, pump 114 can draw a known amount of fluid (comprising both the sample line fluid volume 116a and air bubble 116b) into sample zone 116. Thus, the amount 116c of fluid drawn into the sample zone 116 is known, as this amount 116c is the amount of fluid that pump 114 has drawn into sample zone 116.

Figure 1F:
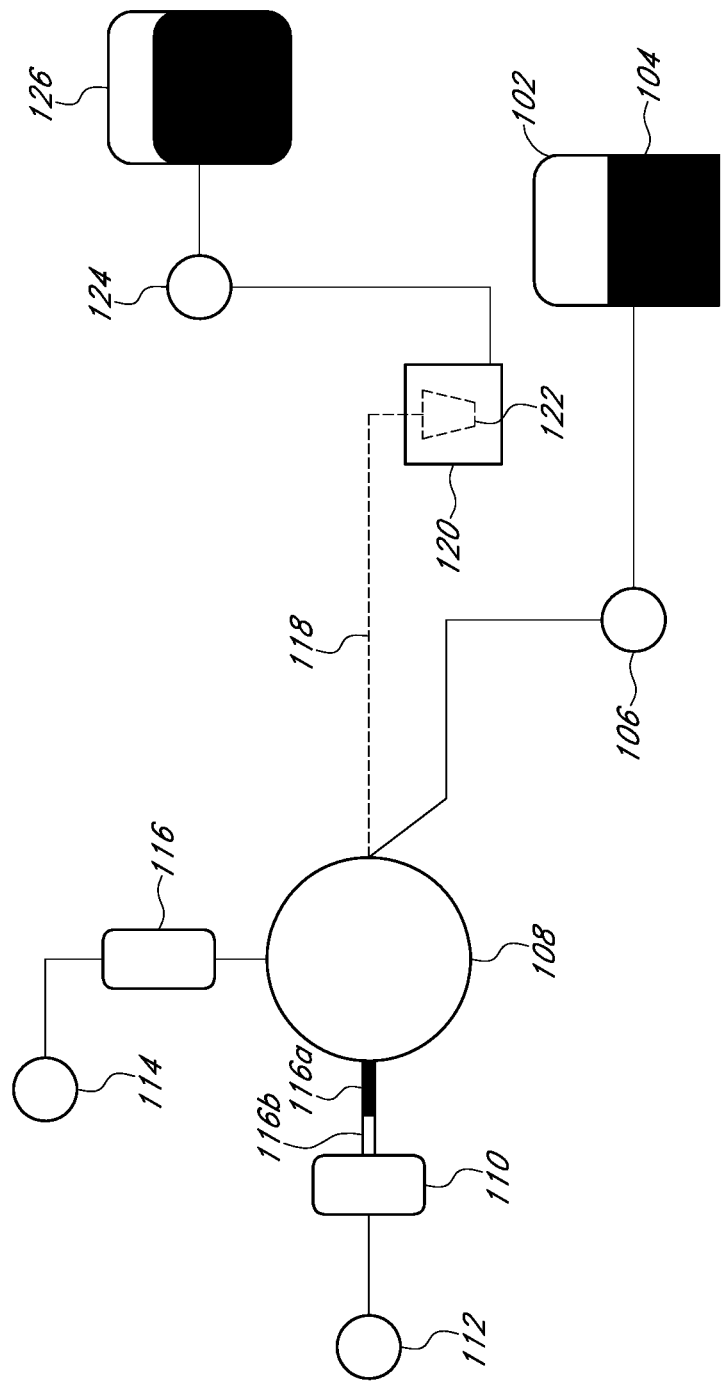

FIG. 1F illustrates that pump 112 draws the fluid within the sample zone 116 (comprising the sample line fluid volume 116a and air bubble 116b) through flow diverter 108 (e.g., a rotary valve), towards fluid boundary sensor 110. (As shown in FIG. 1F, bubble 116b is about to enter sensor 110, with sample volume 116a following bubble 116b.) The fluid boundary sensor is configured to detect a signal related to a boundary between fluids. In some embodiments, the fluids are immiscible fluids. That is, the sensor, which can detect signals, such as optical signals, electric signals, acoustic signals, or any combination thereof, can determine a first signal related to a first fluid (e.g., air, bubble 116b, etc.) or calibration fluid, then when the first fluid passes through, the signal obtained by the boundary sensor changes, as the properties and qualities of the focus fluid are distinct from the initial calibration fluid's measurement.

In some embodiments, the fluid boundary sensor is a bubble sensor. In some embodiments, the fluidic pathway between sample zone 116 and fluid boundary sensor 110 is pre-filled with a prefill fluid, e.g., a fluid that is the same as first fluid 104. The prefill fluid can be a fluid that is immiscible with air bubble 116b.

Figure 1G:
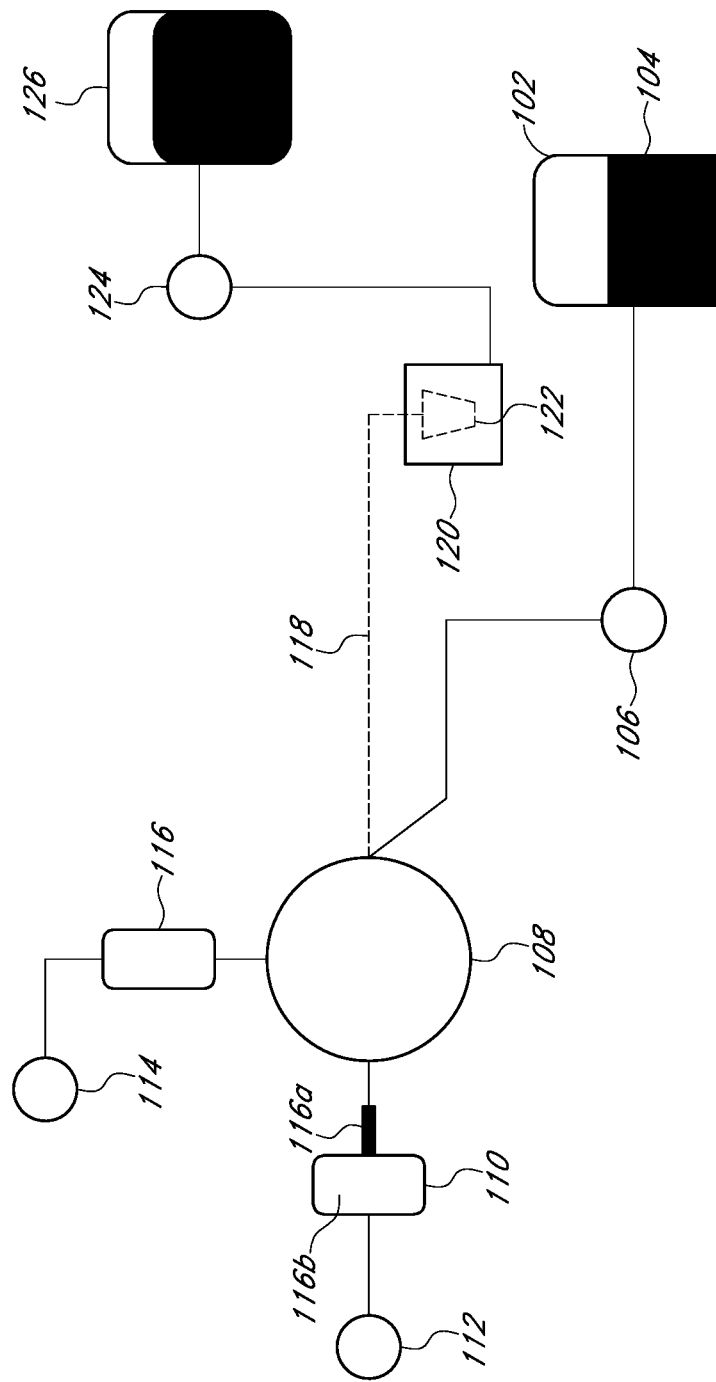
Figure 1H:
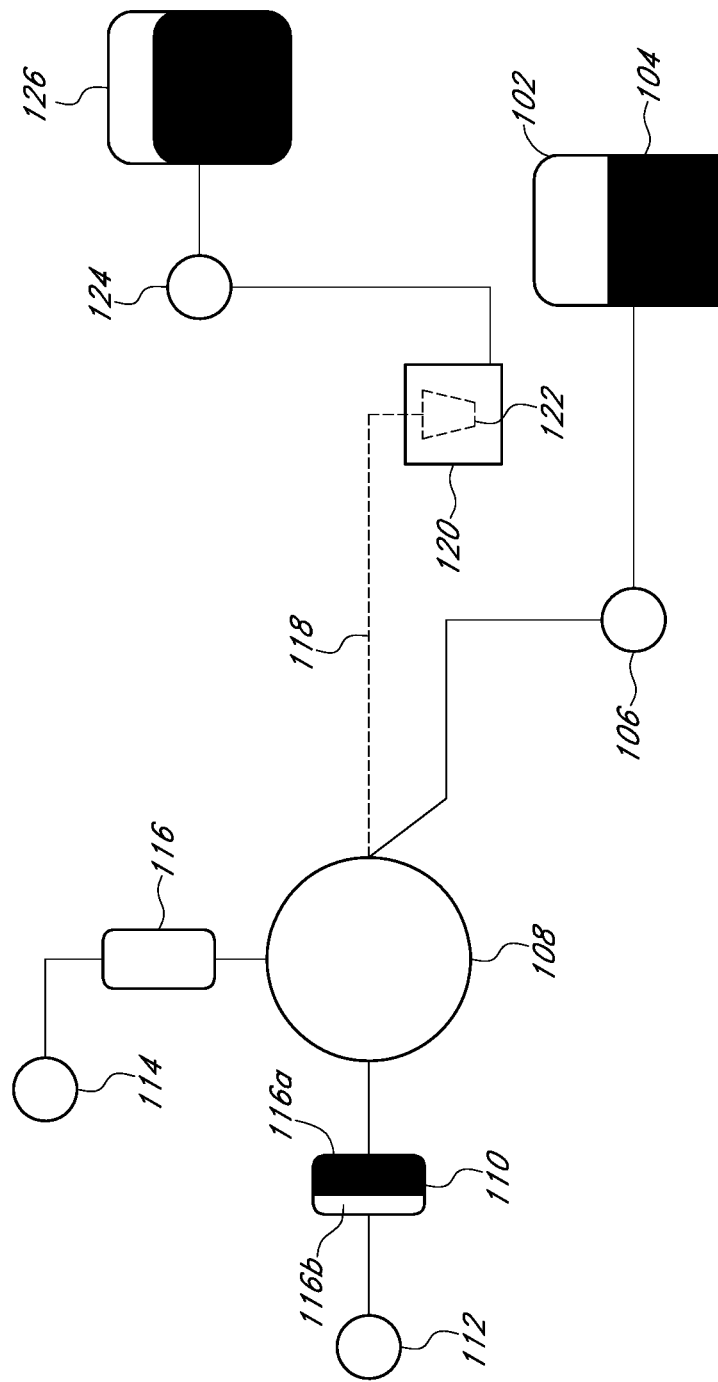

When pump 112 has drawn bubble 116b completely into the fluid boundary sensor 110, as illustrated in FIG. 1G, sensor 110 can determine the start and end points of each of the bubble 116b and the sample line fluid volume 116a. (As shown in FIG. 1G, bubble 116b has entered sensor 110, and sample line volume 116a is about to enter sensor 110; the sensor is configured to detect the "beginning" and "end" of bubble 116b.)

As pump 112 continues to draw sample line fluid volume 116a into the fluid boundary sensor 110 (FIG. 1H), the start and end points of the sample line fluid volume 116a, as well as any additional bubbles, if any, that may be contained within the sample line fluid volume. In various embodiments, the presence of additional bubbles once the sample line fluid is first identified can indicate an air leak and/or problem with one or more components of the system (e.g., a hole in one or more tubing) that allows air bubbles to be introduced.

Accordingly, the use of the fluid boundary sensor provides the start and end times of each of the various fluids initially contained in the sample zone. From the fluid boundary information, as well as the known volume (116c, shown in FIG. 1E) drawn into sample zone 116, the user and/or system can determine the volume of bubble 116b, and from that the sample line fluid volume 116a by subtracting the volume of bubble 116b from the total drawn volume 116c, i.e., 116c=116a+116b.

In various embodiments, the readings from the fluid boundary sensor can be analyzed at a computing device comprising a processor that determines, from the boundary readings, the volume of bubble 116b and sample line fluid volume 116a in the manner provided above. For example, certain aspects can be executed by a machine, such as a computer, through program code execution. Program code (i.e., instructions) embodied in tangible storage media or memory media implemented as storage devices, such as magnetic or optical media, volatile or non-volatile media, may be included. One or more programs that may implement or utilize the processes described in connection with the disclosure, e.g., through the use of an application programming interface (API), reusable controls, or the like, and can automate one or more operations disclosed herein.

Figure 1I:
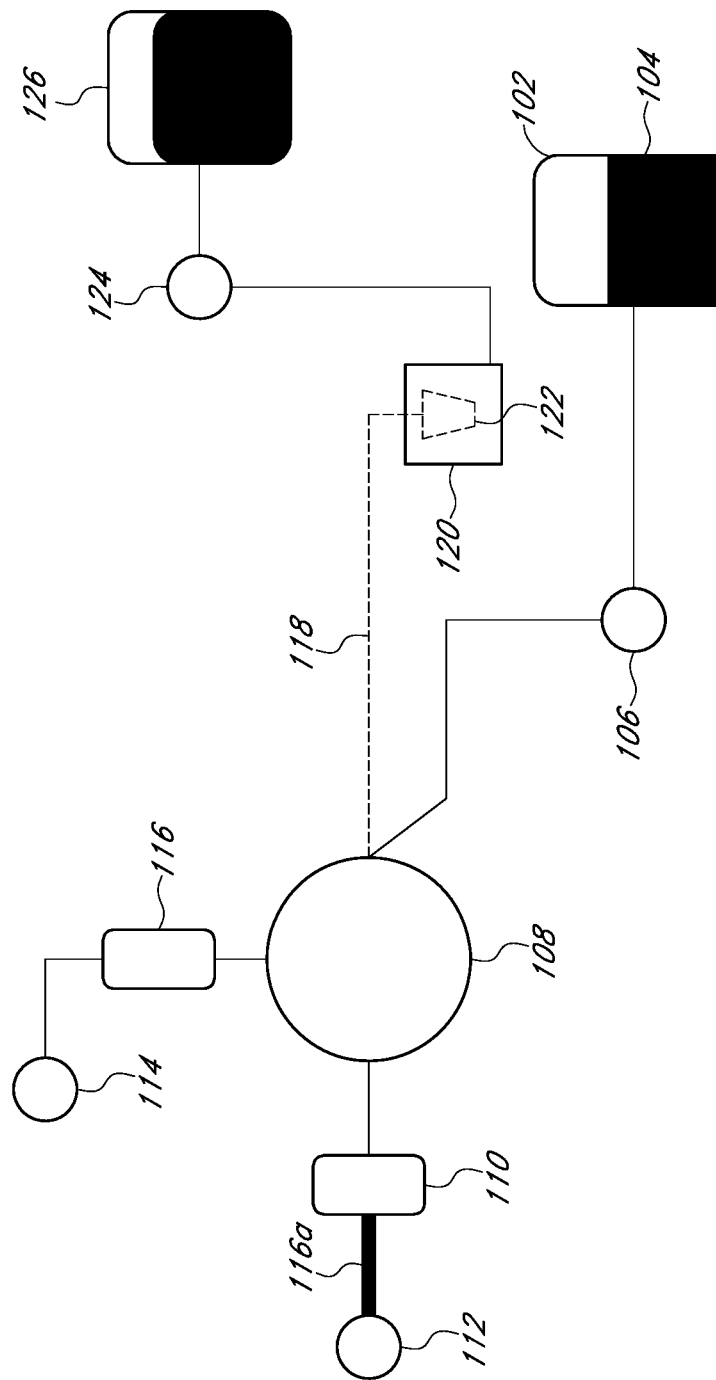

FIG. 1I illustrates the pump 112 drawing all of sample line fluid volume 116a through the fluid boundary sensor 110. After passing through the boundary sensor 110, the sample line fluid volume should be known, and the sample fluid can be delivered to one or more conduits for use. Sample line volume 116a can be drawn through sensor 110 (after bubble 116b has been drawn through sensor 110) so that sensor 110 can detect the presence of any other bubbles (or other occlusions) in sample line fluid 116a. Without being bound to any particular theory, the presence of one or more bubbles in sample line fluid 116a can be indicative of a leak (e.g., an air leak) somewhere in the system, and the identification of bubbles in sample line fluid 116a can thus be used as a system diagnostic that can in turn inform the user regarding the presence (or absence) of leaks in the system.

It will be appreciated that the disclosed systems and methods are not limited to the specific depictions illustrated in FIGS. 1A-1I. In addition, the drawings are not necessarily drawn to scale, and the text labels on the various parts of the drawings are illustrative only and are not limiting of the disclosed technology.

In various embodiments, the pumps described herein can be any of a variety of pumps, including but not limited to syringe pumps and diaphragm, for drawing up fluid to its intended location. In addition, any of a variety pumps can be used to load a user-specified or predetermined amount of fluid can be implemented. For each pump referenced in the Figures, one or more pumps can be utilized in accordance with embodiments described herein. It will be appreciated that the depicted examples are not limiting to the embodiments provided in this disclosure.

Figure 2:
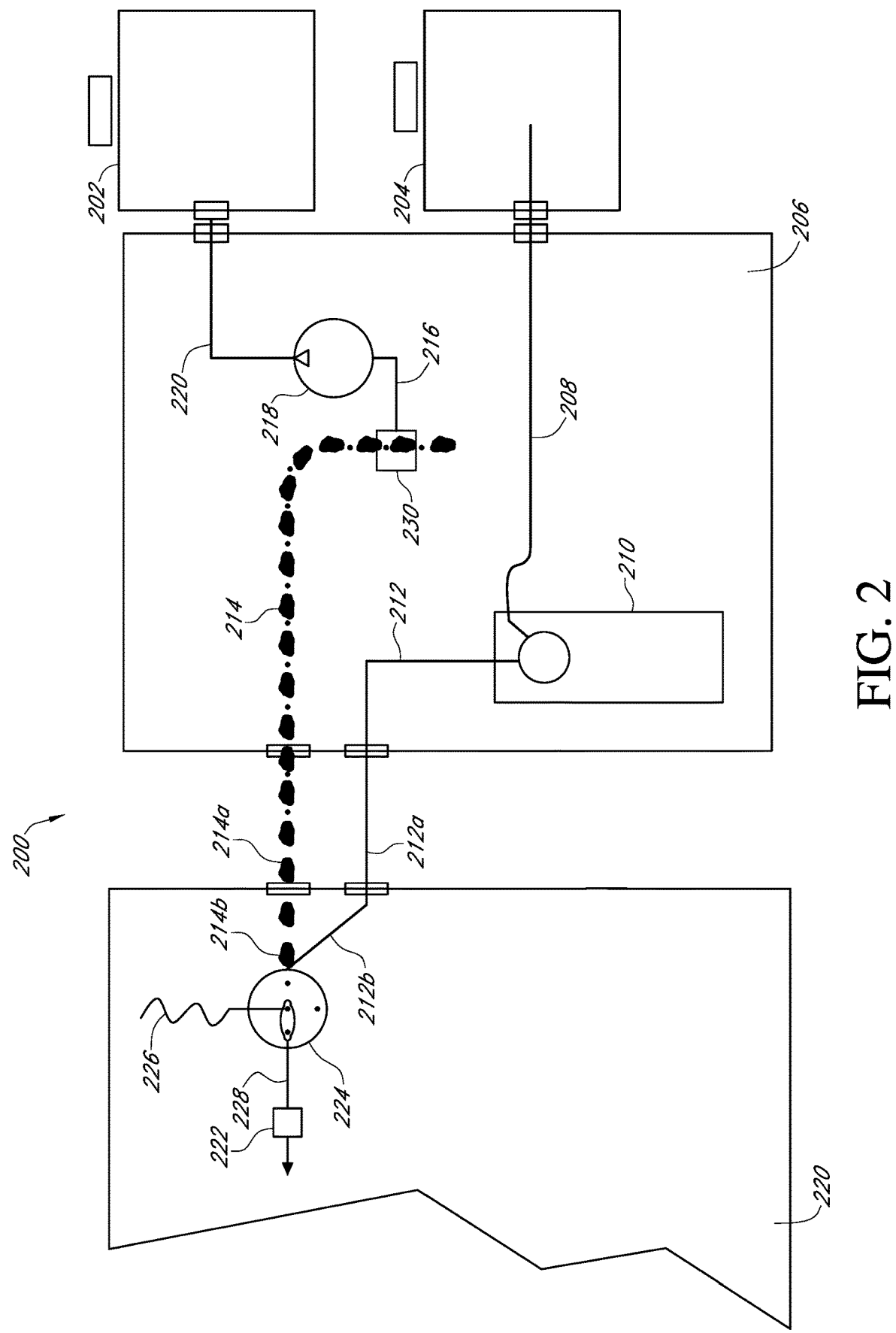
FIG. 2 provides a depiction of an exemplary embodiment according to the present disclosure.

FIG. 2 provides a depiction of another exemplary system 200 in accordance with the present disclosure.

In the depicted embodiment, an auto sampler 206 and an instrument 220. The instrument can be a flow cytometer analyzer, e.g., an Attune™ NXT flow cytometer analyzer (Thermo Fisher Scientific Inc.), other flow cytometer analyzer, flow cytometer sorter/separator, or other fluidic instrument. The auto sampler 206 and instrument 220 are utilized in accordance with the disclosed systems and methods. As shown, a sample fluid, e.g., focus fluid, stored in a storage volume 204 (e.g., a bottle or other container) is drawn up through line 208 by a pump 210 (which pump can be, e.g., a syringe pump) through a line (212/212a/212b) to a sample line (214, 214a, 214b) that spans the auto sampler 206 and instrument 220 (e.g., a cytometer). As shown, the auto sampler 206 and instrument 220 can be located at a distance from one another, which distance can be spanned by line 212/212a. Pump 218 (which can be, e.g., a diaphragm pump) can encourage the sample fluid into sample line 214/214a/214b. Pump 218 pump can comprise one or more check valves so as to ensure fluid flow in only a single direction. Pump 218 can also be configured so as to completely fill the sample line. A container 230 can receive sample fluid from line 214. Line 216 (if present) can connect container 230 to pump 218. Instrument 220 can include a sample injection port and/or one or more sample holders; a sample holder can accommodate tubes or other sample containers.

Excess focus fluid at the end of sample line 214 can be collected and delivered into a waste container 202. As an example, a diaphragm pump can draw excess fluid from the head of sample line 214 to waste container 202. At this point, the exact volume of the sample line may or may not be known.

Valve 224 can be configured so as to admit sample fluid in line 214/214a/214b to sample loop 226, without also admitting the sample fluid to line 212b or line 228. The sample fluid can be encouraged into sample loop 226 by a pump, which pump can be a pump that delivers a known amount of fluid to the sample loop. The known amount of fluid can be, for example, all of the sample fluid that resides in line 214/214a/214b plus an additional amount of another fluid, e.g., air or other gas, or other fluid. The other fluid can be a fluid that is immiscible with the sample fluid.

As an example, after the sample line 214/214a/214b is filled, a pump connected to valve 224 (which can place sample loop 226 and sample line 214/214a/214b into fluid communication with one another), draws the sample fluid from sample line 214/214a/214b up into sample loop 226 along with an air bubble; the total volume of fluid (i.e., the sample line fluid volume plus the air bubble) is known.

The rotary valve can be actuated to place the sample loop and bubble sensor into fluid communication with one another), and a pump can then be used to draw the air bubble and sample fluid from the sample loop through the bubble sensor. The measurements from the bubble sensor identifying the boundary positions of the air bubble and sample fluid, as well as the known amount drawn up into the sample loop, can be used to determine to determine a volume of the air bubble, and a volume of the sample fluid. The volume of the sample fluid can then correspond to the volume in the sample line, when the sample line is completely filled.

As an example, a pump can be configured to draw into the sample loop 450 µl of fluid, for example. (The total amount drawn into the sample loop, i.e., the sample fluid plus air, will be greater than the total amount contained in the sample line so as to ensure that an air bubble is present within the sample loop.) In some scenarios, an amount of focusing fluid and air can be estimated (e.g., 370 µl fluid, 80 µl air) based on one or more known factors about the system, and in others, the amount of each fluid is unknown.

A valve (e.g., a rotary valve) is then modulated to direct the fluid from the sample loop 226 towards bubble sensor 222. As the air bubble and fluid pass through bubble sensor 222, the start and end positions of each of the bubble and the focus fluid are recorded. From that information, as well as the known amount of air and focus fluid contained in the sample loop, the size of the bubble can be determined. For example, if, based on the bubble sensor readings it was determined that the air bubble volume is 83 μl, then the actual sample line fluid volume would be 367 μl (i.e., 450 μl— 83 μl=367 μl).

It should be understood that although the numbers in the present example are in the range of hundreds of microliters, the disclosed systems and methods are not limited to the microliter range. For example, one can apply the disclosed technology concepts to determine hundreds of milliliters or more, based on the system and the volume size to be determined.

Further, the size of the bubble is not critical, and is ultimately connected to the type of bubble sensor (or other fluid boundary sensor), its sensitivity, and intended purpose. For example, use of an ultrasonic bubble sensor, e.g., for flow cytometry, may result in an attempt to ensure that the bubble greater than 10 ul. However smaller bubbles can be used. A user may wish to have a bubble larger than a minimum size based on the sensor, and to be able to ensure that the whole bubble is detected.

Valve 224 can then be modulated so as to admit the sample fluid (and other fluid) from sample loop 226 to line 228 (but not to lines 212b or 212b). The sample fluid is then communicated to sensor 222 (which can be, e.g., a bubble sensor). As described elsewhere herein, the amount of fluid in sample loop 226 is known, so the amount of fluid communicated to sensor 222 from sample loop 226 is also known.

Sensor 222 then detects an interface between the sample fluid and the other fluid that is communicated to the sensor. By detecting the interface, the system can then determine the volume of fluid that was originally contained in sample line 214/214a/214b. In this way, the user can—as described elsewhere herein—perform experiments with less waste and greater throughput, as the user will know how much sample fluid is being delivered to the sample loop for each experimental run being performed in the sample loop.

In some embodiments, the disclosed systems and processes could be conducted infrequently, such as at installation or when the system has changed (e.g., after maintenance or service, after replacing one or more system components). Additionally, and/or alternatively, the disclosed systems and methods can be utilized as a periodic maintenance activity (e.g., every few months or on another recurring schedule).

Figure 3:
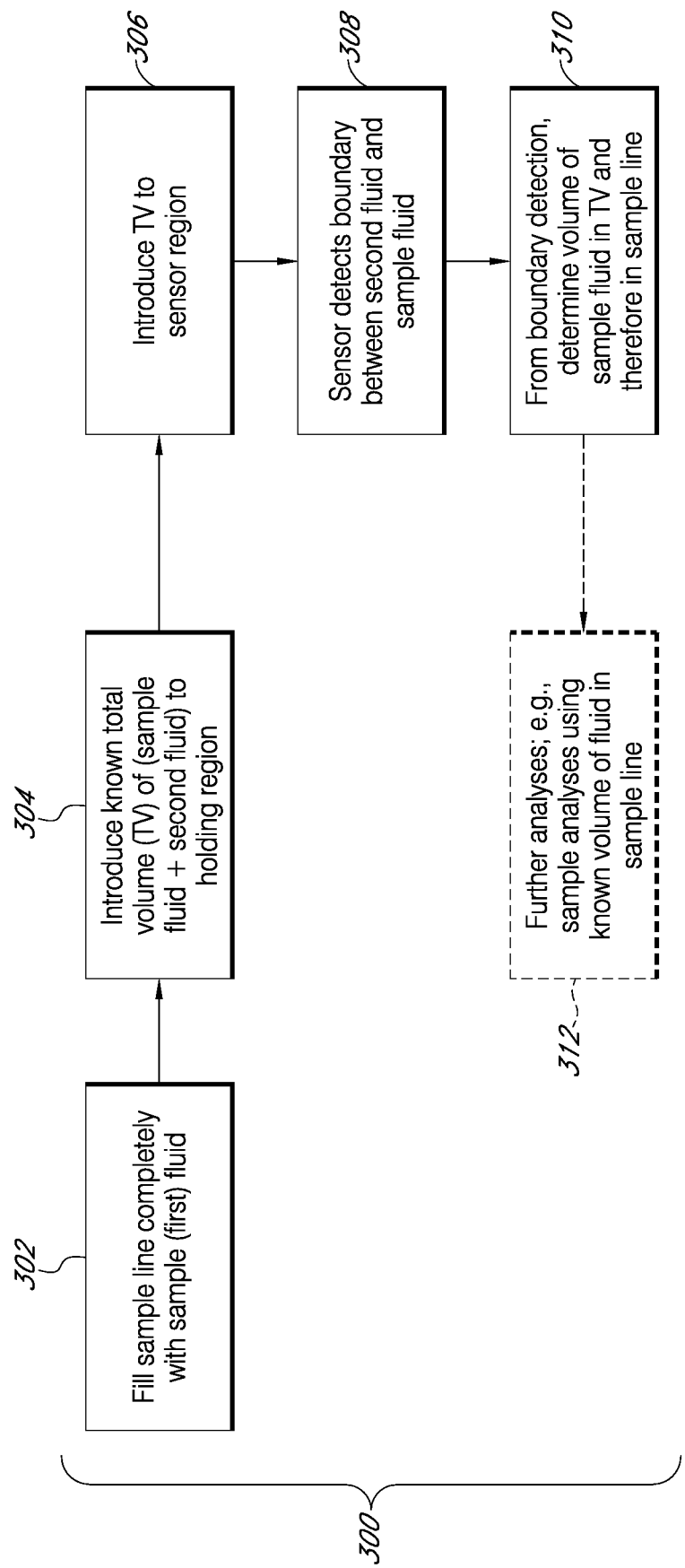
FIG. 3 provides a flowchart of an embodiment of the disclosed technology.

FIG. 3 provides an exemplary flowchart of method 300 according to the disclosed technology. As shown, method 300 can include step 302 of filling a sample line (completely) with a first fluid. Such a fluid can be, e.g., buffer, sheath fluid (e.g., for acoustic and/or hydrodynamic focusing).

This can be accomplished by, e.g., overfilling the sample line, stopping the flow of first fluid to the sample line, and collecting any overflow fluid from the sample line, leaving behind the sample line completely filled. One can then (step 304) introduce to a holding region a total volume (TV) made up of the sample fluid from the completely filled sample line and a volume of a second fluid to a holding location. The holding location can be, e.g., a sample loop, a container, or other location. The TV of the first fluid and the second fluid can be introduced to a sensor region (step 306), e.g., a tube, a vessel, or the like. The sensor region can include a sensor—such as a bubble sensor—that can detect a boundary between two fluids, e.g., air and water. A bubble sensor can operate by ultrasound, by capacitance, or by other modes known to those in the art. The total volume (TV) of the first fluid and second fluid can be communicated through the sensor region, e.g., at a known flowrate. The sensor can detect (step 308) the presence of a boundary between fluids (e.g., between the second fluid and the sample or first fluid). From the detection of a boundary (step 310), one can (manually or in an automated fashion) determine the volume of one (or both) of the first fluid and the second fluid in the TV.

As an example, if TV is known to be 500 μL, the TV is passed through the sensor region at 100 μL per minute, and a bubble sensor detects the front boundary of the TV (i.e., where the second fluid begins) at t=0s and a boundary between the first and second fluids at t=1 minute after the front boundary, then one can determine that the TV includes 100 μL of the second fluid and 400 μL of the first fluid. This in turn establishes that the sample line defined a volume of 400 μL, the volume of the first fluid in the TV. One can (step 312) perform further analysis (e.g., flow cytometry), as one would then know the volume of the fluid in the (fully filled) sample line. In this way, one knows the precise amount of fluid being (i.e., 400 μL, in the foregoing example) delivered from the sample line to the sample zone for each analysis being performed in the sample zone.

Exemplary Aspects

The following Aspects are illustrative only and should not be understood as limiting the scope of the present specification or the scope of the appended claims.

Aspect 1. A method comprising: disposing a calibration volume of a first fluid into the sample line such that the calibration volume completely fills the sample line, the filled sample line defining a volume SL therein; communicating into a sample zone the calibration volume of the first fluid and also a displacement volume D of a second fluid, the calibration volume of the first fluid and the displacement volume D of the second fluid defining a total volume; communicating the total volume from the sample zone to a sensor configured to identify a boundary between the first fluid and the second fluid; and from the boundary, estimating the volume SL of the sample line.

Fluidic lines (e.g., the sample line) can be formed of flexible or rigid materials. Flexible tubing is considered suitable, but is not a requirement.

It should be understood that one or more of the steps of the disclosed methods can be performed in an automated fashion. As an example, the step of communicating the first and second fluids into the sample zone can be performed in an automated fashion.

As shown in FIGS. 1A-1I, fluid can be drawn into a sample line, and the valve that places the sample line into fluid communication with the sample line can be closed such that the sample line (118, in FIG. 1C) is completely filled. The sample line's end can be immersed in a catchment container (112, in FIG. 1C), which is then emptied so as to leave behind the sample line in a completely filled state.

Aspect 2. The method of Aspect 1, wherein the sensor detects a change in an electrical signal, a change in an acoustic signal, a change in an optical signal, or any combination thereof. As an example, a sensor can detect a change in optical signal based the illumination received when a liquid is disposed within the sensor as compared to the illumination received with air is disposed within the sensor. A sensor can also be configured to detect a change (e.g., a change in conductance, a change in optical signal, a change in acoustic signal) related to a boundary between a first fluid (e.g., air) and a second fluid (e.g. buffer). The first fluid and the second fluid can be immiscible with each other.

Aspect 3. Any one of Aspects 1 or 2, further comprising communicating into the sample line a volume of the first fluid that exceeds a volume that completely fills the sample line and removing first fluid that exceeds the volume that fills the sample line so as to leave the sample line completely filled. This can be performed in a manual or an automated fashion.

Aspect 4. Any one of Aspects 1-2, further comprising communicating through the sample line a volume of the first fluid that exceeds a volume that fills the sample line and then removing first fluid that exceeds the volume that fills the sample line so as to leave the sample line filled to the end of the sample line. This is shown in FIG. 1D and FIG. 1E, in which excess fluid exits sample line 118 and at least partially fills vessel 120 (FIG. 1D). That excess fluid is then removed from vessel 120 (FIG. 1E), leaving sample line 118 filled to the end.

Aspect 5. Any one of Aspects 1-4, wherein the first fluid and the second fluid are immiscible. As an example, the first fluid can be a buffer, growth medium, sheath fluid (also termed a focus fluid in some instances), or other fluid, and the second fluid can be air.

Aspect 6. Any one of Aspects 1-5, wherein the method is performed in an automated fashion.

Aspect 7. Any one of Aspects 1-6, wherein the second fluid comprises air.

Aspect 8. Any one of Aspects 1-7, further comprising operating the sample zone so as to analyze one or more fluid samples, each of the one or more samples having a sample volume of the volume SL. A sample zone can include, e.g., a particle concentration train (hydrodynamic concentration, acoustic concentration, or both). A sample zone can include one or more sensors (e.g., a illumination emitter and detector) configured to interrogate one or more analytes disposed in a sample that enters the sample zone.

As described elsewhere herein, in existing approaches, sample arrival times are calculated with comparatively large margins of error to allow for variations in the line volume. This in turn results in waste of potentially valuable sample, and portions of both ends of the analysis period must be discarded (and with such discard, the potential loss of valuable information that could be critical for both research purposes as well as clinical purposes associated with diagnosing a patient). Through application of the disclosed technology, a user can determine, with precision, the volume of a sample line and thus the volume of fluid (e.g., buffer, sheath fluid) that is in turn delivered to the sample loop or zone, which sample loop or zone can include one or more analysis or processing modules, such as a flow cytometer, cell, sorter, and the like.

By knowing the amount of fluid being delivered to the sample zone, a user can thus operate the sample zone more efficiently, without having to discard significant portions of the "ends" of a sample in a given analysis period. For example, a user knowing that precisely 30 μL of sample is delivered to the sample zone for each experimental run can in turn configure the sample zone to process the middle 29.5 μL of each 30 μL portion of fluid delivered to the sample zone. If, on the other hand, a user (e.g., a user who uses existing approaches) knows only that the sample line contains from 25 to 35 μL of sample, the user may be forced to conservatively configure the sample zone, e.g., to process only the middle 20 μL of sample, a significant reduction in volume from the volume that could be reliably processed using the disclosed technology.

The advantages of the disclosed technology are thus apparent, as knowing the volume of the sample line allows the user to analyze a greater proportion of a given sample, as the user need not build in a margin of error and discard as much of the sample. A user can also increase throughput, as a user can use less sample per experimental run, which in turn increases the number of experimental runs that can be performed per time. Further, because one can use less sample per experimental run, one may be able to obtain samples (blood, etc.) more easily, as less fluid will be needed per sample. Thus, the disclosed technology also includes configuring (whether manually or in an automated way) the operation of the sample zone based on the determined volume of the sample line. The configuring can include adjusting the sample zone to operate using less sample, to operate with less discarding of sample (e.g., the sample "ends" of a given experimental run), or other adjustment. By using less sample per experimental run, a user can also perform experiments with the use of less reagents.

Aspect 9. A system, comprising: a sample line enclosing a volume SL therein; a sample zone configured to receive a first fluid from the sample line; a fluid delivery train configured to (a) deliver a volume of the first fluid into the sample line, (b) deliver a calibration volume (CV) of the first fluid that completely fills the sample line from the sample line into the sample zone, and (c) deliver a displacement volume D of a second fluid into the sample zone such that the calibration volume CV of the first fluid and the displacement volume D of the second fluid define a total volume TV; a sensor region configured to receive the first fluid and the second fluid from the sample zone and to detect a boundary between the first fluid and the second fluid; a flow diverter configured to (a) place the sample line into fluid communication with the sample zone, (b) place the sample zone into fluid communication with the sensor, or both (a) and (b); and optionally, a processor configured to determine a volume enclosed by the sample line based on at least a difference between the volume D of the displacement volume of the second fluid and the total volume TV.

A fluid delivery train can include one or more pumps, valves, flow diverters, and the like. Pumps can be syringe pumps, gear pumps, and the like. It should be understood that a pump can act to expel fluid, but can also act to draw fluid in. As an example (and by reference to FIGS. 1D, 1E, and 1F), pump 114 can act to draw sample line fluid 116a into sample zone 116, along with bubble 116b. Pump 114 can then act to expel fluid 116a and bubble 116b from sample zone and encourage fluid 116a and bubble 116b out of sample zone 116, through flow diverter 108, and toward (and even into) sensor 110. Thus, pump 114 can be operated in forward and reverse modes.

By reference to FIGS. 1A-1I, pump 112 is optional. Likewise (and again by reference to FIGS. 1A-1I, the locations and operation of any of pumps 106, 124, 114, and 112 can be optional, as one or more of the foregoing pumps may not be needed. Put another way, any of pumps 106, 124, 114, and 112 are optional, as the fluid delivery train of the disclosed systems (and methods) can operate using one pump and can even operate in a gravity-based fashion. Through arrangement of valves, the disclosed systems and methods can be operated by a single pump, though multiple pumps can be used.

Aspect 10. The system of Aspect 9, further comprising a vessel in fluid communication with an end of the sample line, the vessel being configured to receive fluid communicated through the sample line.

Aspect 11. The system of Aspect 10, further wherein the fluid delivery train is further configured to remove fluid from the vessel while fluid is retained within the sample line such that the sample line is completely filled.

Aspect 12. The system of any one of Aspects 9-11, wherein the flow diverter comprises a single valve.

Aspect 13. The system of Aspect 12, wherein the single valve is characterized as a rotary valve.

Aspect 14. The system of any one of Aspects 9-13, wherein the flow diverter train comprises a plurality of valves. As an example, a flow diverter train can include a valve that modulates flow between the sample line to the sample zone, and another valve that modulates flow between the sample zone and the sensor region.

Aspect 15. The system of any one of Aspects 9-14, wherein the sensor region comprises a bubble sensor.

Aspect 16. The system of any one of Aspects 9-15, further comprising an instrument (e.g., a flow cytometer) configured to analyze a sample disposed in first fluid received by the instrument from the sample zone.

Aspect 17. The system of Aspect 16, wherein the system is configured to operate the instrument based at least in part on a volume enclosed by the sample line.

Aspect 18. The system of Aspect 17, further comprising an autosampler.

Aspect 19. The system of Aspect 18, wherein the autosampler is located at a distance from the instrument.

Aspect 20. The system of Aspect 19, wherein the sample line places the autosampler into fluid communication with the instrument. In this way, a system can be configured to determine the volume of the sample line that connects the autosampler to the instrument. This can be accomplished each time an instrument and autosampler are connected, e.g., when an instrument is connected to a new autosampler, such as when an autosampler is replaced. Likewise, this can be accomplished when an instrument is replaced but the autosampler remains in place.

Aspect 21. The system of any one of Aspects 9-20, wherein the system comprises a region configured to contact a sample and the first fluid.

Aspect 22. The system of Aspect 21, wherein the sample comprises cells, cellular components, or both.

Aspect 23. The system of any one of Aspects 9-22, wherein the volume enclosed by the sample line is in the range of from about 30 microliters to about 2.5 milliliters, e.g., from about 50 microliters to about 2 milliliters, from about 75 microliters to about 1.75 milliliters, from about 100 microliters to about 1.5 milliliters, from about 200 microliters to about 1.5 milliliters, from about 250 microliters to about 1.25 milliliters, from about 350 microliters to about 1.1 milliliters, from about 450 microliters to about 950 microliters, from about 550 microliters to about 850 microliters, or even from about 650 microliters to about 725 microliters.

Aspect 24. A method for estimating a volume of a first fluid, the method comprising: delivering an amount of a first fluid to a conduit; delivering an amount of a second fluid into the conduit so as to displace the first fluid within the conduit; estimating a total volume of the first fluid and the second fluid in the conduit; delivering the first fluid and the second fluid from the conduit to a sensor capable of determining a boundary between the first fluid and the second fluid; determining a volume of the second fluid in the total volume; and estimating a volume of the first fluid based on at least the volume of the first fluid and the estimated total volume of the first fluid and the second fluid.

Aspect 25. The method of Aspect 24, wherein the first fluid comprises air.

Aspect 26. The method of any one of Aspects 21-22, further comprising operating an instrument based at least in part on the estimated volume of the first fluid, the instrument optionally being configured for fluid communication with the conduit.

Aspect 27. The method of Aspect 23, wherein the instrument is a flow cytometer.

Aspect 28. The method of any one of Aspects 26-27, wherein the first fluid is communicated to the instrument from a sample line.

Aspect 29. The method of Aspect 28, wherein the volume of the first fluid delivered to the instrument is a volume enclosed by the sample line.

Aspect 30. The method of any one of Aspects 28-29, wherein the sample line is disposed so as to place an autosampler in fluid communication with an instrument.

Aspect 31. The method of Aspect 30, wherein the autosampler is located at a distance from the instrument.

Aspect 32. The method of any one of Aspects 21-31, wherein the determining the volume of the second fluid in the total volume is based, at least in part, on detecting the boundary between the first fluid and the second fluid.

Aspect 33. A system for automatically determining the volume of a sample, the system comprising: a sensor region; a fluid delivery train configured to separately deliver a volume of a second fluid and a volume of a first fluid into the sensor region, the sensor region being configured to measure a signal through the sensor region, the signal differing based on the presence of the first fluid in the sensor region or the presence of the second fluid in the sensor region; and a processor configured to determine a volume of the sample based on the signal measured when the first fluid and the second fluid are communicated through the sensor region.

Aspect 34. The system of Aspect 33, wherein the first fluid comprises air.

Aspect 35. The system of any one of Aspects 33-34, further comprising an instrument and optionally a flow modulator, the system being configured to place the instrument into fluid communication with the sensor region.

Aspect 36. The system of Aspect 35, wherein the instrument comprises a flow cytometer, the flow cytometer optionally being characterized as an acoustic flow cytometer.

Aspect 37. The system of any one of Aspects 35-36, further comprising a sample line, the system being configured to place the sample line into fluid communication with the instrument.

Aspect 38. The system of Aspect 37, wherein the instrument is operable based on an estimated volume of the sample line.

Aspect 39. The system of any one of Aspects 37-38, further comprising a collection train configured to collect excess fluid from the sample line so as to leave the sample line completely filled.

Aspect 40. The system of any one of Aspects 37-38, further comprising a source of the first fluid, the system being configured to place the source of first fluid into fluid communication with the sample line.

Aspect 41. The system of any one of Aspects 33-40, wherein the system is configured to contact the first fluid with a sample.

Aspect 42. The system of Aspect 41, wherein the sample comprises cells, cellular components, or both.

What is claimed:

1. A method for estimating a volume of a first fluid, comprising:

delivering an amount of the first fluid to a sample line;
delivering an amount of a second fluid into the sample line so as to displace the first fluid within the sample line;
estimating a total volume of the first fluid and the second fluid in the sample line;
delivering the first fluid and the second fluid from the sample line to a sensor capable of determining a boundary between the first fluid and the second fluid; determining a volume of the second fluid in the total volume; and
estimating a volume of the first fluid based on the boundary and the estimated total volume of the first fluid and the second fluid.

2. The method of claim 1, further comprising operating an instrument based at least in part on the estimated volume of the first fluid, the instrument optionally being configured for fluid communication with the sample line.

3. The method of claim 2, wherein the instrument is a flow cytometer.

4. The method of claim 2, wherein the volume of the first fluid delivered to the instrument is a volume enclosed by the sample line.

\* \* \* \* \*